United States Patent
Kato et al.

(10) Patent No.: US 6,739,888 B2
(45) Date of Patent: May 25, 2004

(54) STRUCTURE OF CONNECTING SHIELDED CONNECTORS

(75) Inventors: Hajime Kato, Shizuoka (JP);
Mitsuhiro Matsumoto, Shizuoka (JP);
Yutaka Masuda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/441,117

(22) Filed: May 20, 2003

(65) Prior Publication Data

US 2003/0216072 A1 Nov. 20, 2003

(30) Foreign Application Priority Data

May 20, 2002 (JP) ......................................... 2002-144163

(51) Int. Cl.[7] .............................................. H01R 13/62
(52) U.S. Cl. ........................................ 439/157; 439/607
(58) Field of Search ................................ 439/157, 160, 439/607, 372, 266

(56) References Cited

U.S. PATENT DOCUMENTS

| | | | |
|---|---|---|---|
| 4,303,292 A | * 12/1981 | McNeel | 439/152 |
| 4,787,860 A | * 11/1988 | Bender | 439/358 |
| 4,840,574 A | * 6/1989 | Mills | 439/157 |
| 4,981,440 A | * 1/1991 | Werner et al. | 439/266 |
| 5,035,634 A | * 7/1991 | Hasircoglu et al. | 439/157 |
| 5,174,774 A | * 12/1992 | Le Bris et al. | 439/160 |
| 5,951,316 A | * 9/1999 | Kawano et al. | 439/352 |
| 6,142,787 A | * 11/2000 | Ikesugi | 439/372 |
| 6,273,756 B1 | * 8/2001 | Ward et al. | 439/607 |

FOREIGN PATENT DOCUMENTS

JP       2000-48912       2/2000

* cited by examiner

*Primary Examiner*—Renee Luebke
*Assistant Examiner*—Briggitte R. Hammond
(74) *Attorney, Agent, or Firm*—Armstrong, Kratz, Quintos, Hanson & Brooks, LLP

(57) ABSTRACT

When one shielded connector is engaged with the other shielded connector, a conductive connector housing of the one connector is electrically connected to a conductive connector housing of the other connector to establish shield connection. Either one of the connectors has a conductive rotating lever, while the other connector has an engaging portion for engaging with the rotating lever to connect the shielded connectors by rotation of the rotating lever. A conductive resilient abutting member, which abuts on the rotating lever and/or the other connector housing to be resiliently deformed when the connectors are connected with each other by rotation of the rotating lever, is provided on the rotating lever and/or the other connector housing.

4 Claims, 7 Drawing Sheets

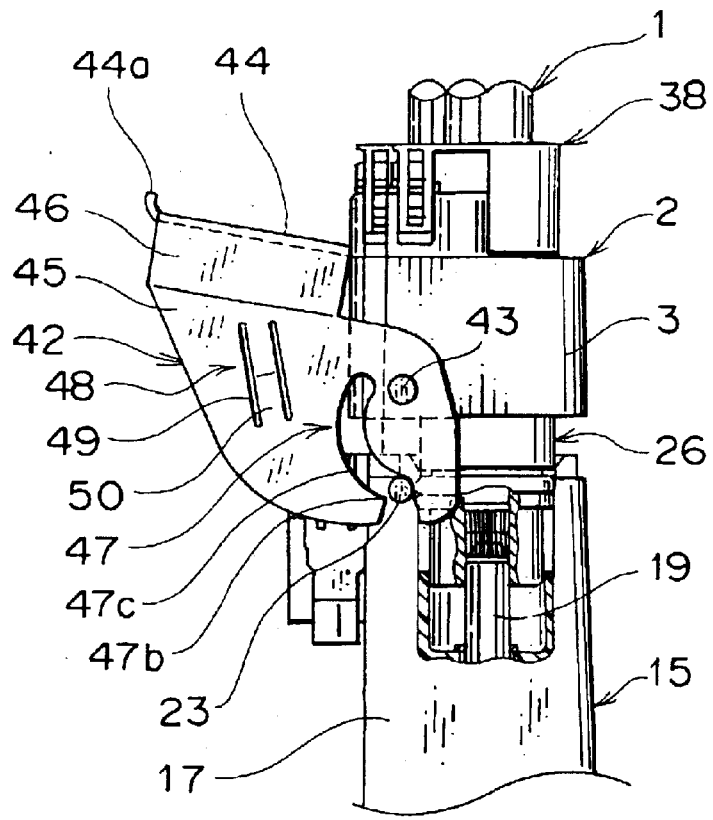
F I G. 2
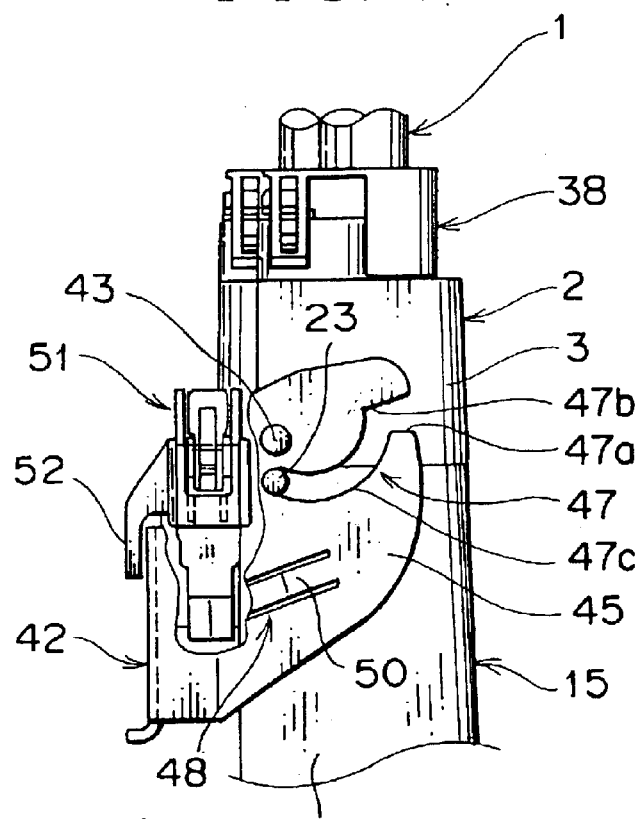
F I G. 4

STRUCTURE OF CONNECTING SHIELDED CONNECTORS

BACKGROUND OF THE INVENTION

1. Field of the Invention

This invention relates to a structure of connecting shielded connectors.

2. Description of the Related Art

Recently, shielded electrical wire is being used in vehicles, and particularly in an electric vehicle for shielding from electromagnetic noise. An end of the shielded wire is attached to a shielded connector, which is connected to another shielded connector of an electrical equipment such as an electric motor or connected to another shielded connector of another shielded wire. Namely, by connecting the shielded connector with another shielded connector, core wire of the shielded wire is electrically connected to a terminal of the shielded connector, and braided wire of the shielded wire is electrically connected to an electrically conductive housing or a connector housing to establish shield connection.

One example of a structure for connecting shielded connectors is disclosed in Japanese Patent Application Laid-Open No. 2000-48912. Specifically, as shown in FIGS. 8 and 9, a male insulated housing 62 having a flat male terminal 61 is mounted from an outside of a shield box 60 on an outer surface 64 of a side wall 63. Then, the flat male terminal 61 and an internal male cylinder 66 are inserted into an opening 65 of the side wall 63, and a bolt 67 is inserted through an attachment hole 68 formed on the side wall 63. When a flange 69 is abutting on the outer surface 64 of the side wall 63, a top of the bolt 67 is protruded on an inside surface of the side wall 63. Thus, the male insulated housing 62 is temporarily held on the outer surface 64.

Next, a male shield shell 70 is inserted from the inside of the shield box 60 into the opening 65 of the side wall 63. In this insertion, first, a shell base 71 is protruded in an engaging recess 72 of the male insulated housing 62 and the bolt 67 is inserted through a through hole 74 of an attachment piece 73, while the attachment piece 73 is abutting on an inner surface 75 of the side wall 63. Next, the male insulated housing 62 is fixed on the side wall 63 of the shield box 60 by screwing the bolt 67 into a nut (not shown). At this time, because of abutting on the inner surface 75 of the side wall 63 through the attachment piece 73, the shell base 71 is electrically connected to the shield box 60.

By inserting an auxiliary cylinder 76 into the engaging recess 72 of the male insulated housing 62, the auxiliary cylinder 76 is attached to the shell base 71. Thus, one male shield shell 70 is composed of the shell base 71 and the auxiliary cylinder 76. Then, a female housing 77 is engaged with the male insulated housing 62 mounted on the shield box 60. Thus, a connecting terminal 79 connected to core wire of shielded wire 78 and the flat male terminal 61 are engaged with each other to be electrically connected with each other, while a female shield shell 81 connected to braided wire 80 of the shielded wire 78 and the male shield shell 70 are engaged with each other to be electrically connected with each other.

As described above, the connecting terminal connected to core wire of shielded wire and the flat male terminal are engaged with each other to be electrically connected with each other, while the female shield shell connected to the braided wire of the shielded wire and the male shield shell is engaged with each other to be electrically connected with each other, because the female housing is engaged to the male housing after the male insulated housing is attached to the outside surface of the shield box, and the conductive shield shell is attached to the shield box in such a manner that a part of the shield shell is protruded in the mail housing and electrically connected to the shield box. Therefore, noise invasion and signal leakage can be prevented.

However, because the female shield shell connected to the braided wire of the shielded wire is engaged with the male shield shell in the male housing, a connection of the connectors cannot be ascertained.

This invention has been accomplished to solve the problem and an object of this invention is to provide a structure of connecting shielded connectors for performing shield connection reliably and allowing to ascertain the connection.

SUMMARY OF THE INVENTION

The object of the invention has been achieved by providing a structure of connecting shielded connectors comprising: a pair of connectors; conductive connector housings of the respective connectors; a rotatable conductive lever mounted on either one of the conductive connector housings; an engaging part of the other conductive connector housing for engaging with the rotatable conductive lever to connect the pair of connectors with each other; and a resilient conductive abutting member mounted on the rotatable conductive lever and/or the other conductive connector housing for abutting on the other conductive connector housing and/or the rotatable conductive lever as being resiliently deformed, whereby said pair of connectors establishes shield connection when being connected with each other.

In this structure, when the rotatable conductive lever is rotated to connect the pair of connectors with each other, the resilient abutting member abuts on the other connector housing and/or the rotatable conductive lever to be resiliently deformed. Therefore, because the rotatable conductive lever is connected with the other connector housing through the conductive resilient abutting member, the pair of the conductive connector housing is electrically connected with each other reliably. Further, because the rotatable conductive lever is connected with the other connector housing through the resilient abutting member, the lever is wobble-free while connecting. Therefore, because a wobbling state of the rotatable conductive lever differs according to whether the shielded connectors are connected with each other or not, a state of connection between the conductive connector housings can be ascertained by the wobbling state of the rotatable conductive lever.

Preferably, the rotatable conductive lever has a longer rotary length than a moving length, for allowing the shielded connector to be inserted into the other shielded connector with low insertion force. With this manner, the shielded connectors can be easily engaged with the low insertion force.

Preferably, the resilient abutting member is disposed in a path of rotation of the rotatable conductive lever to connect the shielded connectors with each other, at where the resilient abutting member starts to abut on the other connector housing and/or the rotatable conductive lever.

In this case that the resilient abutting member is disposed in a path of rotation of the rotating lever at where the resilient abutting member starts to be resiliently deformed, the rotating lever can be rotated with smaller force than that in a case that the resilient abutting member is being deformed from a start of said rotation. It is because the rotation of the rotating lever in this manner of this invention does not need an additional force for deforming the resilient member at the start, while said rotation needs a large force for rotating the rotating lever at the start. Therefore, the pair of shielded connectors can be connected with each other easier.

Preferably, the resilient abutting member is a flat spring formed by bending a part of the rotatable conductive lever and/or the other conductive connector housing. This manner does not need additional conductive member as a resilient abutting member and guarantees an electrical connection between the resilient abutting member and the rotatable conductive lever or the other connector housing. Therefore, a reliable shielded connection can be achieved with a simple structure.

BRIEF DESCRIPTION OF THE DRAWINGS

FIG. 2 is a side view showing an initial engaging state of a shielded connector according to this invention;

FIG. 4 is a side view showing an attaching state of the shielded connector according to this invention;

DESCRIPTION OF THE PREFERRED EMBODIMENT

One embodiment of a structure of connecting shielded connectors according to this invention will now be described below with reference to the attached drawings.

FIGS. 1 to 7 show one example of the structure of connecting shielded connectors according to this invention. In FIGS. 1 to 7, a shielded electric wire 1 is to be inserted into a wire insertion hole 4 of a conductive connector housing 3 of a shielded connector 2, and then to be attached.

Figure 6:
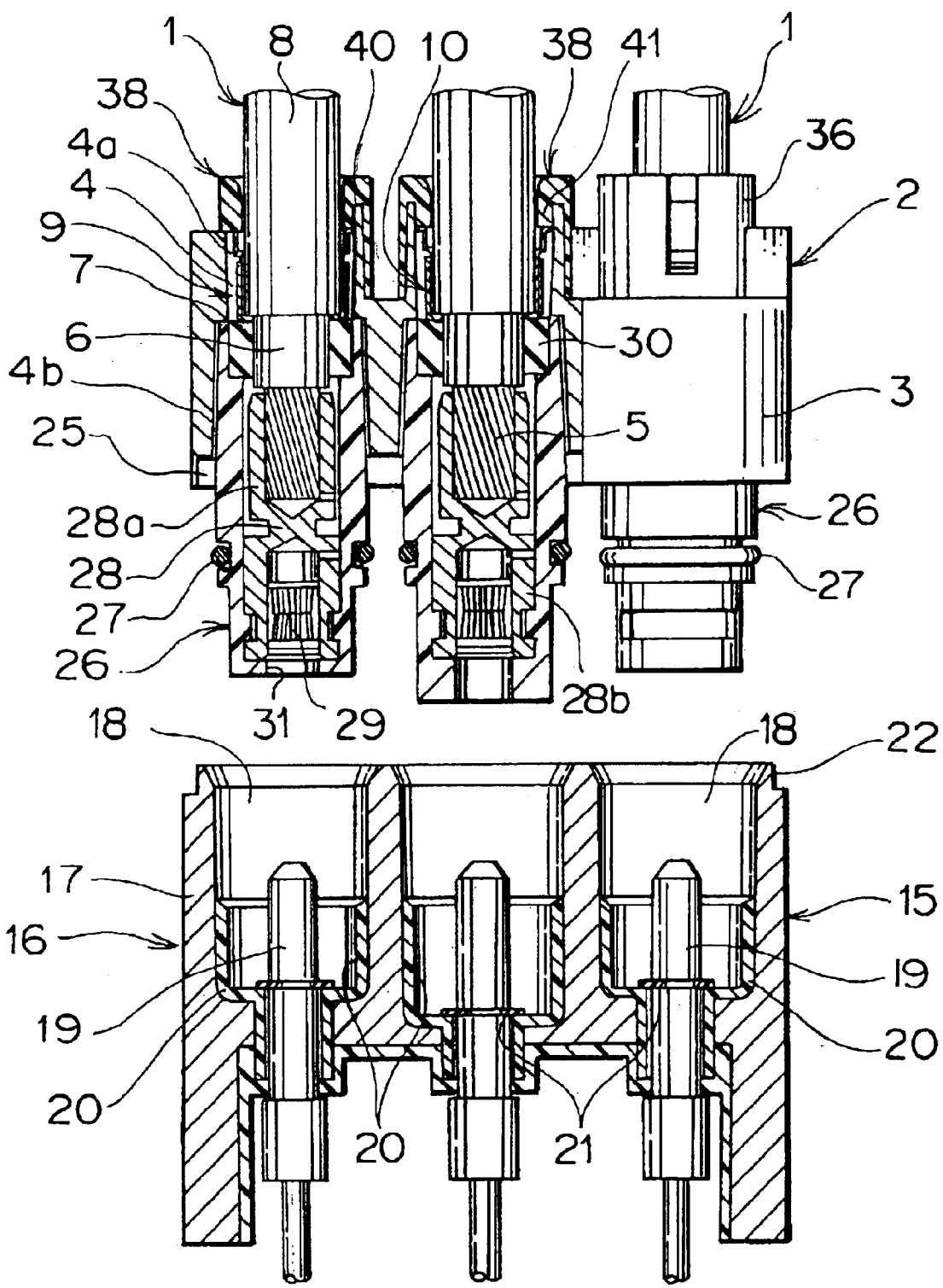
FIG. 6 is a cross-sectional view showing one example of an interior structure of the shielded connector according to this invention.
Figure 7:
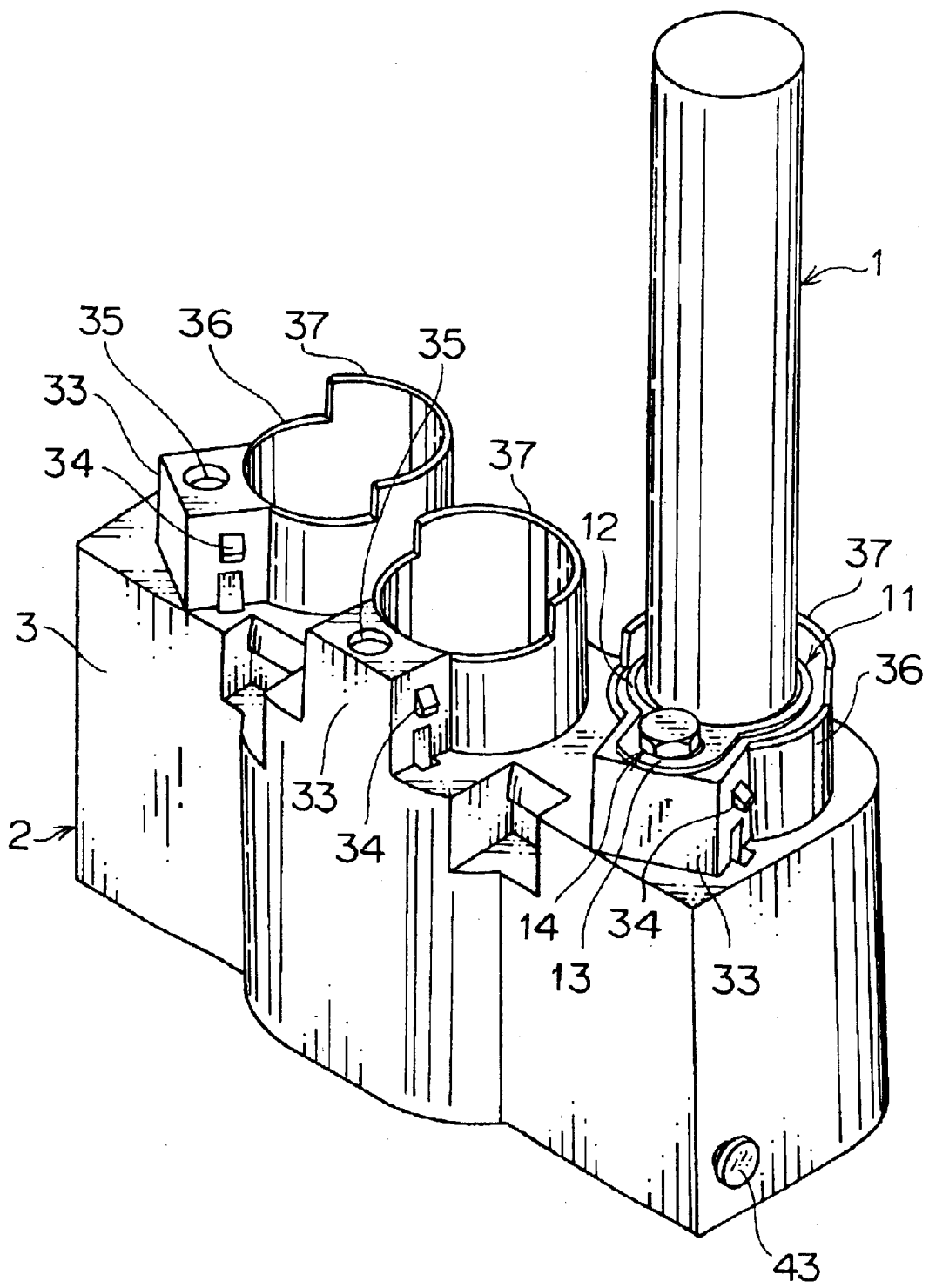
FIG. 7 is a perspective view showing one example of the other shielded connector according to this invention.
Figure 8:
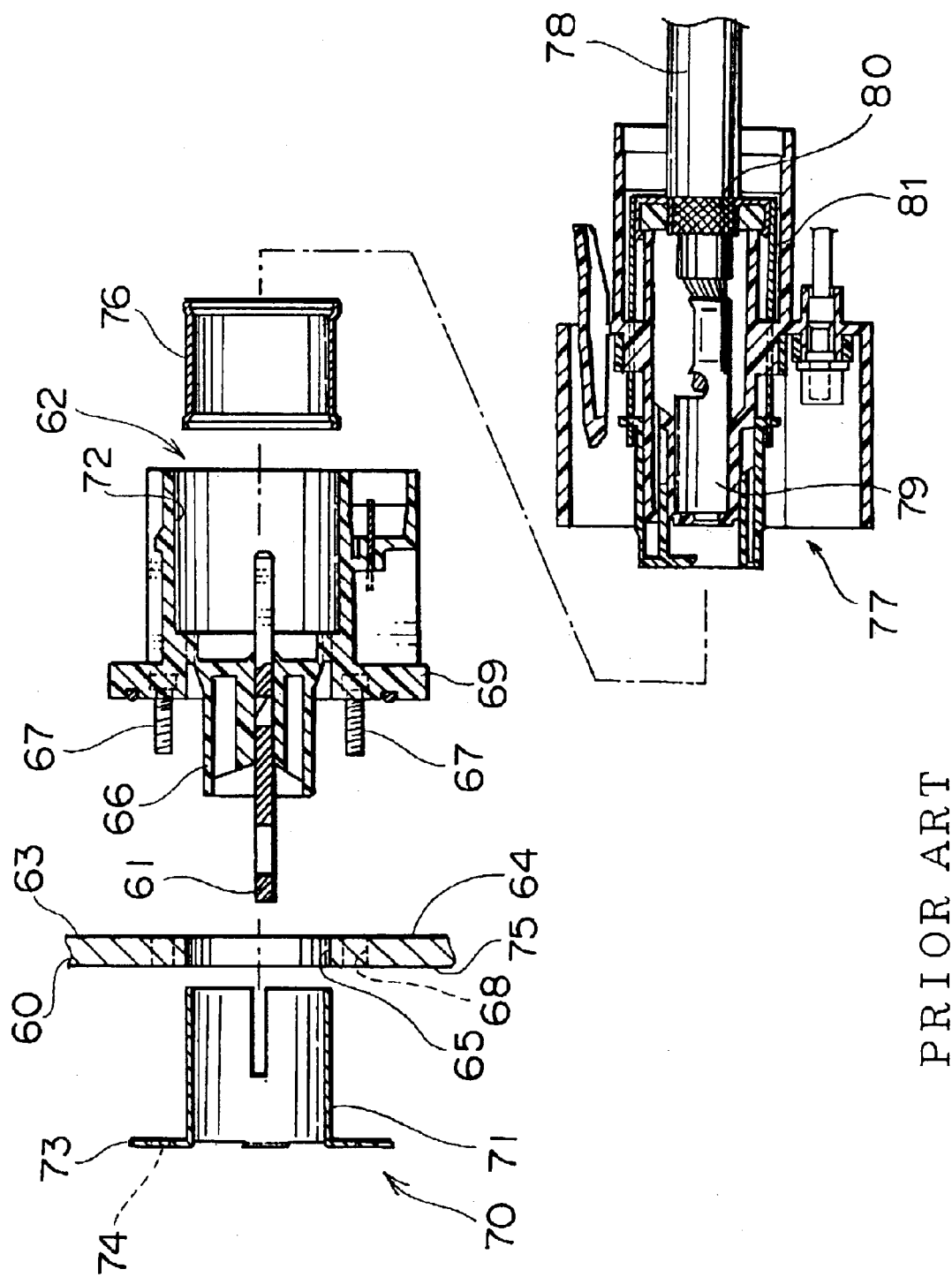
FIG. 8 is a cross-sectional view showing a conventional structure of connecting shielded connectors.
Figure 9:
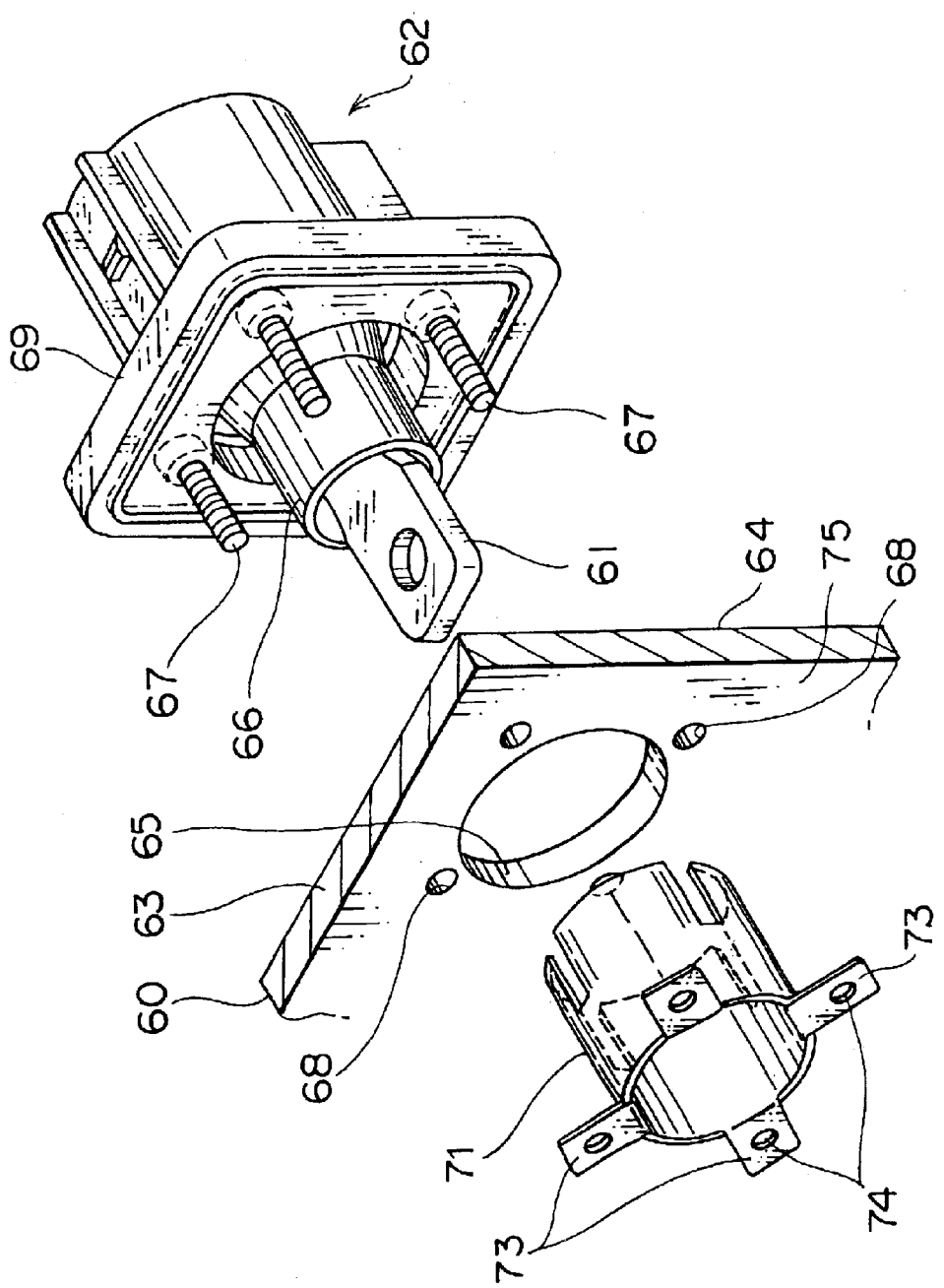
FIG. 9 is a perspective view for explaining an attaching state of the other shielded connector according to conventional structure of connecting shielded connectors.

A core wire 5, an inner insulator cover 6, a braided wire 7 and an outer insulating cover 8 are laminated concentrically sequentially to compose the shielded electric wire 1 as shown in FIGS. 6 and 7. A conductive shield connection member 9 is attached to an end of the shielded electric wire 1. For connecting electrically between the shield connection member 9 and the braided wire 7, an embodiment of the shield connection member 9 is composed of a clamp member 10 and an attachment member 11 mounted with the clamp member 10 integrally for connecting electrically to the conductive connector housing 3. The clamp member 10 is composed of an inner conductive cylinder (not shown) and an outer conductive cylinder (not shown) and caulked to fix on the shielded electric wire 1. The exposed braided wire 7 is folded back on the outer insulating cover 8 and sandwiched in between said inner and outer conductive cylinders.

The attachment member 11 is composed of a flange portion 12 and an attaching portion 13. An end of the flange portion 12 opposite to the other end at the end of the shielded electric wire 1 in the clamp member 10 is folded back outward in radial direction. The attaching portion 13 is extended outward integrally from a part of the flange portion 12 to abut on and fix to an outer surface of the conductive connector housing 3.

The flange portion 12 has a ring shape, of which outer diameter is formed so smaller than that of the wire insertion hole 4 as to be inserted into the wire insertion hole 4. The attaching portion 13 is a terminal for connecting electrically to the conductive connector housing 3 and has a through hole (not shown) for fixing to the conductive connector housing 3 with such as a bolt 14. A surface of the attaching portion 13 is plated with such as tin in order to prevent rust.

The shielded connector 2 is to be attached to a mating shielded connector 15 to connect. The mating shielded connector 15 is such as a connector of an electric motor on a vehicle, or a connector connected to other shielded wire. In this embodiment, the shielded connector 2 is connected to the mating shielded connector 15 of an electric apparatus. Further in this embodiment, the shielded connector 2 is a male connector and the mating shielded connector 15 is a female connector. The electric apparatus is such as a three-phase motor of electric vehicle. The mating shielded connector 15 having a substantially rectangular shape is integrally protruded on a body of the electric apparatus 16.

Three engaging recesses 18 are arranged in such as an arc shape on a conductive mating connector housing (apparatus housing) 17 of the mating shielded connector 15. Each end of pin terminals 19 of the apparatus is protruded from a bottom in depth direction.

An insulating member 20 is provided in an inner wall from a substantially middle part to a bottom of the engaging recesses 18 and in a space between the pin terminal 19 and the mating connector housing 17 to isolate the pin terminals 19 from the mating connector housing 17.

Further, a C ring 21 is attached to the mating connector housing 17 to engage the pin terminal 19. Incidentally, number of the pin terminals 19 in the mating shielded connector 15 is not limited to three. One, two, four or more is acceptable.

An engaging step 22 is provided around whole side surfaces at a top of the mating shielded connector 15 to engage with the shielded connector 2. As shown in FIGS. 1 to 5, an engaging projection 23, having a pillar shape for example, is provided on a place positioned upper side of one of two opposite side surfaces (first side surfaces 15a) in circumferential direction along the engaging recesses 18 and near a side surface (second side surface) 15b at the outer periphery side of the arc.

Moreover, two connector-attaching members 24 are mounted on the second side surface 15b in a specific interval.

The conductive connector housing (male connector housing) 3 of the shielded connector 2 is formed in a box shape with a cross section substantially similar to the mating shielded connector 15, and has a recess 25 for engaging with the engaging step 22 of the mating shielded connector 15 at one end surface (for example, a bottom end surface as shown in FIG. 6). The wire insertion hole 4 is formed penetrating from a bottom end surface to a top end surface of the conductive connector housing 3. The wire insertion hole 4 has a circular shape with a diameter larger than an outer diameter of the shielded electric wire 1. The wire insertion holes 4 are arranged in an arc shape in a specific interval so that when the shielded connector 2 is engaged with the mating shielded connector 15, the wire insertion hole 4 are arranged coaxially to the pin terminals 19 respectively.

The wire insertion hole 4 is composed of a first insertion hole 4a at which the outer insulating cover 8 of the shielded electric wire 1 is positioned, and a second insertion hole 4b with a larger diameter than the first insertion hole 4a, with which a part of a insulating inner housing 26 is engaged.

The inner housing 26 has a cylinder shape so that a part of the inner housing 26 is engaged with the second insertion hole 4b while the rest of the inner housing 26 is engaged with the engaging recesses 18 of the mating shielded connector 15. An O ring 27 is provided on an outer circumference of the inner housing 26 for engaging with the engaging recesses 18 so as to seal a wall part composing the engaging recesses 18 and the outer circumference of the inner housing 26 when being engaged with the engaging recesses 18.

A connecting terminal 28 is accommodated in the inner housing 26. The connecting terminal 28 is composed of a first connecting member 28a with which the core wire 5 of the shielded electric wire 1 is caulked at such as six places to fix, and a second connecting member 28b into which the pin terminal 19 is inserted. A spring clamp member 29 is provided on the second connecting member 28b with a smaller diameter than the outer diameter of the pin terminal 19.

An opening 31 of the inner housing 26 at the engaging recesses 18 side has a diameter substantially equal to or larger than an inner diameter of the second connecting member 28b of the connecting terminal 28. A locking member (not shown) is attached to the inner housing 26 for locking the connecting terminal 28.

Moreover, a shield rubber 30 for sealing between the inner insulator cover 6 of the shielded electric wire 1 fixed to the connecting terminal 28 and the inner wall of the inner housing 26 is provided in the inner housing 26.

A fixing member 33 against which the attaching portion 13 abuts to fix is provided on a top surface of the conductive connector housing 3. The fixing member 33 is extended in axial direction of the wire insertion hole 4 as a part of the wall composing the wire insertion hole 4. Projections 34 are formed at both side surfaces opposite to each other of the fixing member 33.

An attachment hole 35 having a screw slot is formed at an upper surface of the 33 and at substantially similar position to a through hole against which the attaching portion 13 abuts. By inserting such as the bolt 14 into the through hole of the attaching portion 13 to screw into the attachment hole 35, the attachment hole 35 is fixed on the conductive connector housing 3 with the bolt 14. Said fixation can be achieved with not limited to the bolt 14. Other attachment members, such as a screw, can be used for the fixation.

Moreover, an extending portion 36 in an arc shape composing a part of the wire insertion hole 4 is formed integrally with a surface forming the wire insertion hole of the fixing member 33 on the upper surface of the conductive connector housing 3. The end of extending portion 36 is positioned at a same position as an upper surface of the fixing member 33, but a part of the end of the extending portion 36 is extended in the axis direction of the wire insertion hole 4 from the end of the fixing member 33 as a step member 37. The step member 37 can be formed, for example, by extending the extending portion 36 in the axis direction of the wire insertion hole 4 except a part of the extending portion 36 at a range of about 180 degrees focusing on the fixing member 33.

Incidentally, the step member 37 is not limited to the part of the extending portion 36. A whole of the extending portion 36 can be used as the step member 37 by extending the whole of the extending portion 36 from the upper surface of the fixing member 33. Additionally, the step member 37 is not limited to an arc shape. For example, a plurality of bars can be used as the step member 37 by arranging the bars in a specific interval.

An engaging projection (not shown) for engaging with a rear holder 38 is formed on an outer periphery of the extending portion 36 at an opposite side of the fixing member 33.

The rear holder 38 is attached to the upper surface of the conductive connector housing 3 in order to cover the extending portion 36 and a part of the fixing member 33. Thus, the rear holder 38 prevents the shielded electric wire 1 from coming out of the wire insertion hole 4.

The rear holder 38 has a little larger inner diameter than the outer diameter of the shielded electric wire 1, a larger diameter than an outer diameter of the extending portion 36, and a substantially cylinder shape, having an extending recess 40 for engaging with the extending portion 36. A holder piece 41 is disposed inside the extending portion 36 composing the extending recess 40 of the rear holder 38, and abuts on the flange portion 12 when attaching. Further, engaging recesses (not shown) are formed on the rear holder 38 to attach the rear holder 38 to the conductive connector housing 3 by engaging with an engaging projection 34 of the fixing member 33 and an engaging projection of the extending portion 36 respectively. Moreover, a projection (not shown) for preventing the bolt 14 from coming out of the attachment hole 35 by abutting on a top of the bolt 14 is formed on the rear holder 38.

Two side surfaces at the fixing member 33 side in the arranging direction of the wire insertion holes 4 of the conductive connector housing 3 (the arc direction) are substantially parallel to each other as plane portions 3a. A conductive rotating support member 43 is attached to each of these plane portions 3a for supporting a rotating lever 42 rotationally. Preferably, the rotating support member 43 is detachable, and composed of such as bolts, screws and the like. Specifically, the rotating support member 43 is attached at each lower part of the plane portions 3a of the conductive connector housing 3 and around a surface having the fixing member 33 (the first surface 3b). A projecting portion from the plane portion 3a of the rotating support member 43 is composed of a head portion 43a and a base portion 43b having a smaller diameter than the head portion 43a, in a substantially convex shape.

The rotating lever 42 is composed of a substantially plane lever portion 44 and substantially plane side portions 45 disposed at both ends of the lever portion 44 extending in an orthogonal direction to the lever portion 44. The rotating lever 42 has a substantially U shape cross-section, and is made of conductive material. A length of the lever portion 44 (an interval between two side portions 45) is a little longer than an interval between two plane portions 3a. A thickness of the rotating lever 42, particularly of the side portions 45 is formed so thick that an interval between the outer surfaces of the side portions 45 is a little shorter than an interval between the head portions 43a of the rotating support members 43 attached to the plane portions 3a.

Each side portion 45 has substantially rectangular shape. A hole (not shown) into which the rotating support member 43 is inserted for rotating the rotating lever 42 is formed around one of two corners at the lever portion 44 side of the side portion 45. A diameter of the hole is larger than that of the base portion 43b of the rotating support member 43, and smaller than that of the head portion 43a of the rotating support member 43.

An extending side portion 46 having a rectangular plate shape is formed integrally from a substantially center near the hole side to an opposite side end along a side edge of the rotating lever 42 of the side portions 45 so that when the rotating lever 42 connects the shielded connectors 2, 15, the rotating lever 42 is substantially parallel to a plate shaped part of the first surface 3b, and is at a specified distance from the first surface 3b.
The lever portion 44 is integrally formed at an extending edge of the extending side portion 46.

A folded portion 44a folded substantially perpendicular to a surface of the lever portion 44 is formed at a center of a side edge part opposite to the hole of the lever portion 44.

An engaging groove (engaging hole) 47 for engaging with the engaging projection 23 is formed at the side portion 45 opposite to the first side surface 15a on which the engaging projection 23 of the mating shielded connector 15 is formed. The engaging projection 23 is engaged with (inserted to) the engaging groove 47 when connecting the shielded connectors 2, 15. The engaging groove 47 is formed from an opposite end of the extending side portion 46 toward the extending side portion 46.

Specifically, an opening end is formed at a side edge opposite to the engaging groove 47. The engaging groove 47 is formed substantially straight from the opening end in a specific length in width direction of the opening end (toward the extending side portion 46). The engaging projection 23 moves through this straight portion 47a when initially engaging connectors 2, 15. A straight end portion 47b of the straight portion 47a is an initial engaging position for connectors 2, 15.

Figure 1:
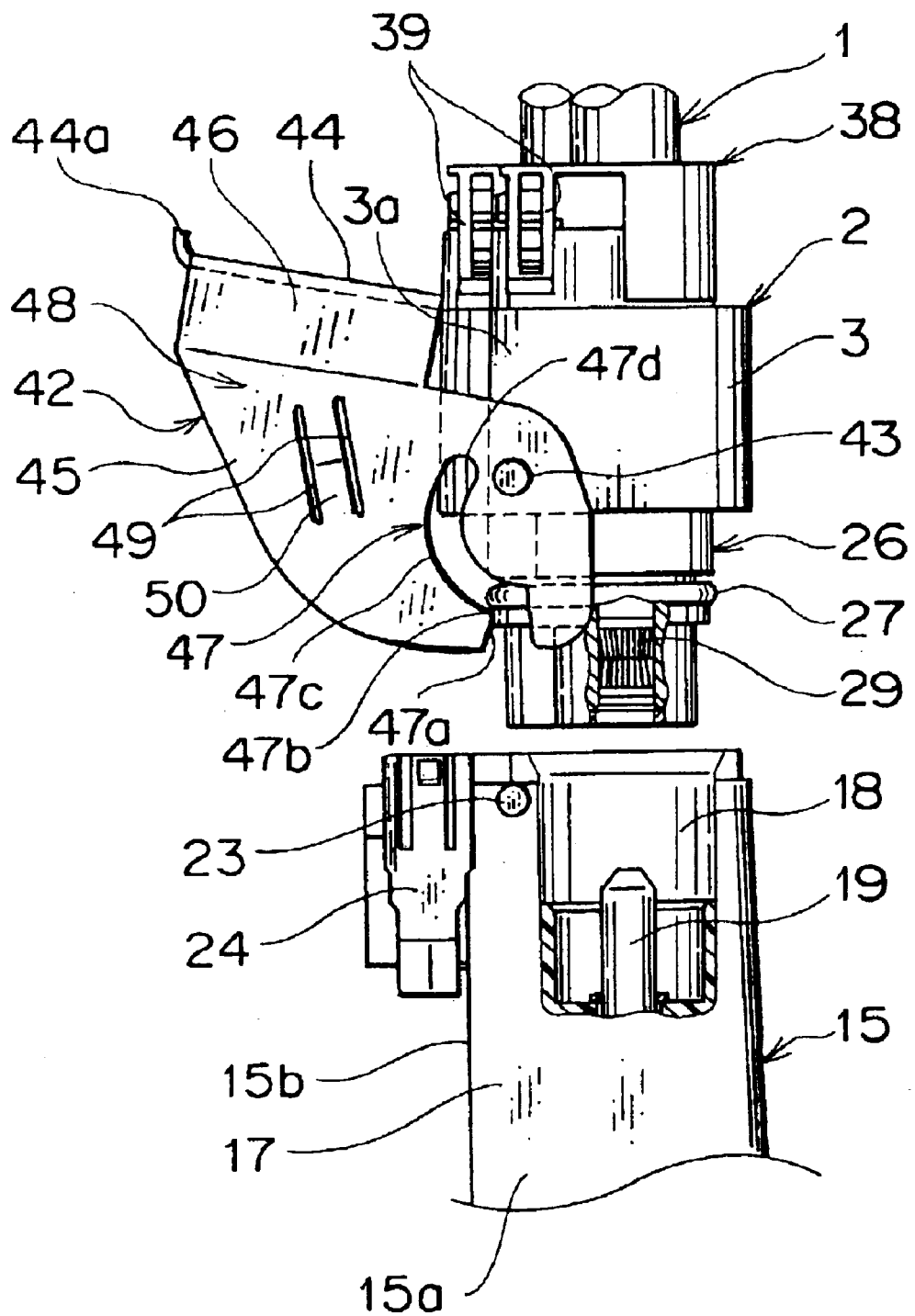
FIG. 1 is a side view showing one example of a structure of connecting shielded connectors according to this invention.

The engaging groove 47 has a curved portion 47c curved from the straight end portion 47b in a substantially same direction as a rotation direction of the rotating lever 42 toward the side edge of the extending side portion 46. The engaging projection 23 moves through the curved portion 47c when completely engaging the connectors 2, 15 from the initial engaging state. An end portion 47d of the curved portion 47c is a complete engaging position for connectors 2, 15. In this manner, by forming the engaging groove 47, as shown in FIG. 1, when connecting the connectors 2, 15 while positioning the lever portion 44 substantially perpendicular to the direction of said connecting (positioning the straight portion 47a of the engaging groove 47 in said connecting direction), the engaging projection 23 is being inserted into the engaging groove 47. Then, by pushing the rotating lever 42 toward the mating shielded connector 15 to rotate the rotating lever 42, the connectors 2, 15 are being connected with each other while the engaging projection 23 is moving through the engaging groove 47. Namely, the rotating lever 42 is composed as a low insertion forth rotating lever having a longer rotary length than a moving length of the connectors 2, 15.

A resilient abutting member 48, which abuts on the first side surface 15a of the mating shielded connector 15 to be resiliently deformed by abutting pressure when connecting the connectors 2, 15 by rotating the rotating lever 42, is provided at the side portion 45 which has the engaging groove 47 of the rotating lever 42. An arrangement position of the resilient abutting member 48 is not limited as long as the resilient abutting member 48 abuts to be resiliently deformed. Preferably, the resilient abutting member 48 is positioned at a position where the resilient abutting member 48 starts to abut in a path of a rotation of the rotating lever 42 for connecting the connectors 2, 15.

The resilient abutting member 48 may be made of conductive material different from that of the side portion 45. Preferably, the resilient abutting member 48 is formed by a part of the side portion 45. Specifically, for example, a pair of parallel slits 49 is provided at one side portions 45. Then, a flat spring 50 for composing the resilient abutting member 48 is formed by bending a space between the slits 49 substantially center in the longitudinal direction of the slits 49 toward the other side portion 45. Preferably, this flat spring 50 (slits 49) is so arranged that when rotating the rotating lever 42, one end of the flat spring 50 or around the end starts to abut on the member of the mating shielded connector 15 (side surface of the mating shielded connector 15). By forming the flat spring 50 in this manner, the flat spring 50 can smoothly abut on the mating connector housing 17 to be resiliently deformed. Namely, preferably an extending direction of the flat spring 50 is so determined that the rotating lever 42 can smoothly rotate when the flat spring 50 is resiliently deformed.

Additionally, the resilient abutting member 48 is provided at the side portion 45 on which the engaging groove 47 of the rotating lever 42 is formed, but it is not limited to this. The resilient abutting member 48 may be provided at another position of the rotating lever 42, the other side portion 45 additionally, or the other side portion 45 alternatively. Further, the resilient abutting member 48 may be provided at the mating shielded connector 15 additionally, or at the mating shielded connector 15 alternatively, so that the resilient abutting member 48 can resiliently abut on such as the side portion 45 of the rotating lever 42 be connected electrically when rotating the rotating lever 42 to connect the connectors 2, 15.

Now, as shown in FIGS. 1 and 6, for connecting the shielded connector 2 with the connecting portion (mating shielded connector) 15, the shielded connector 2 shielded by the shielded electrical wire is so faced to the connecting portion 15 that the inner housing 26 protruded from the shielded connector 2 is to be inserted into the engaging recesses 18 of the connecting portion 15. At this time, the rotating lever 42 is previously attached to the shielded connector 2 rotatably through the rotating support member 43. Then, as shown in FIG. 1, the rotating lever 42 is so positioned that the lever portion 44 is positioned substantially perpendicular to the engaging direction of the connectors (and the straight portion 47a of the engaging groove 47 is positioned in the engaging direction of the connectors).

While keeping this state, as shown in FIG. 2, the shielded connector 2 is shifted to the mating shielded connector 15, so that the inner housing 26 is inserted into the engaging recesses 18 of the mating shielded connector 15. When the inner housing 26 is inserted into the engaging recesses 18, the pin terminal 19 of the engaging recesses 18 is guided into the 26, so that an end of the pin terminals 19 proceeds to the second connecting member 28b of the connecting terminal 28, then the pin terminals 19 abuts on the spring clamp member 29 to stop proceeding any further. This state is an initial engaging state between the connectors 2, 15. At this time, the engaging projection 23 reaches from the opening end of the engaging groove 47 through the straight portion 47a to the straight end portion 47b.

At the initial engaging state of the connectors 2, 15, the lever portion 44 of the rotating lever 42 is pressed in the substantially engaging direction of the connectors to rotate the rotating lever 42. Then, a wall portion composing the curved portion 47c of the engaging groove 47 abuts on the engaging projection 23, so that, for example, if the mating shielded connector 15 is fixed, the shielded connector 2 (conductive connector housing 3) is pressed forward in the engagement direction of the connectors 2, 15 to shift.

Figure 3:
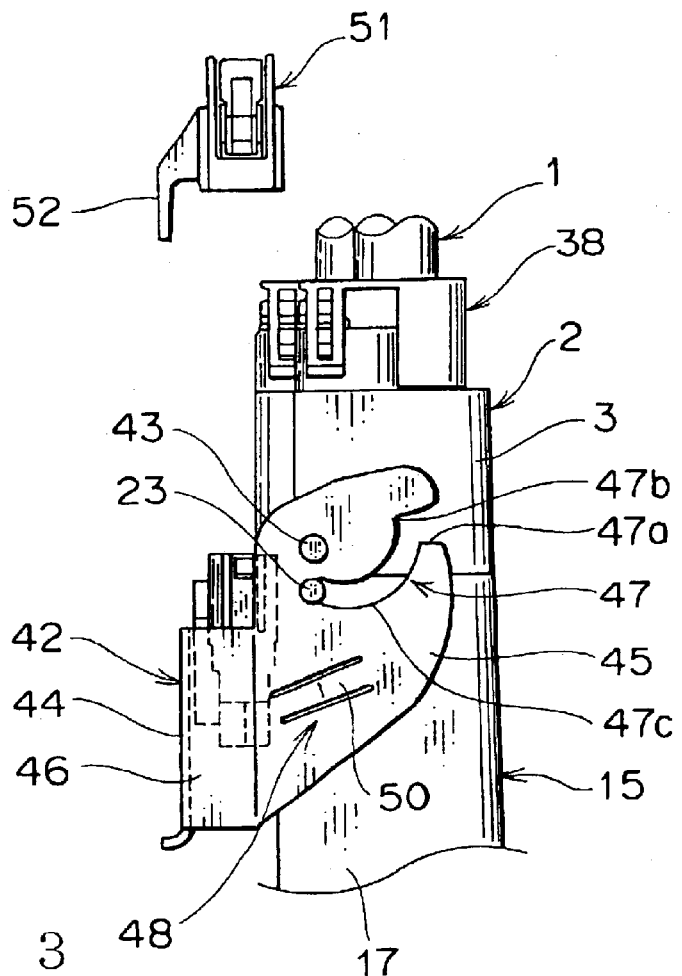
FIG. 3 is a side view showing a full engaging state of the shielded connector according to this invention.
Figure 5:
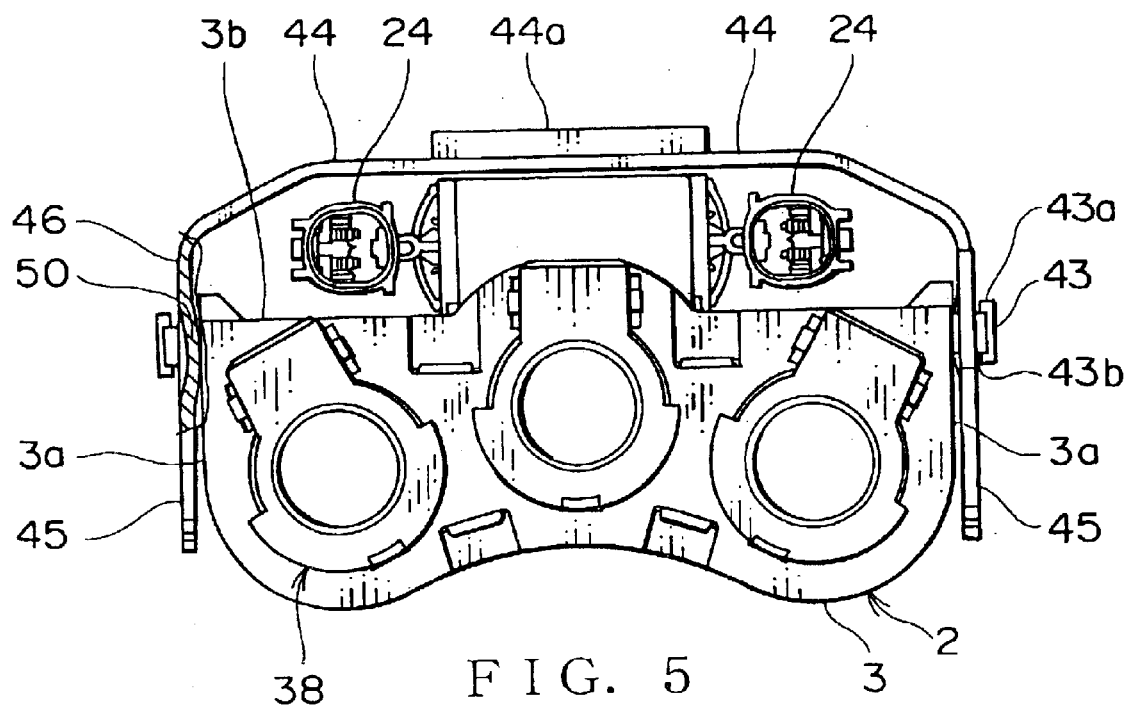
FIG. 5 is a partial cross-sectional plan view showing one example of a resilient abutting member according to this invention.

While the engaging projection 23 is being shifted in the engaging groove 47 with rotating the rotating lever 42, the shielded connector 2 is gradually shifted forward in the engaging direction of the connectors. Then, as shown in FIG. 3, when the engaging projection 23 reaches an end portion 26d of the inner housing 26, the shielded connector 2 stops shifting. In this manner, the pin terminals 19 and the connecting terminal 28 are engaged with each other to be electrically connected with each other, while the conductive connector housing 3 and the mating connector housing 17 are electrically connected with each other, so that the shielded connector 2 and the mating shielded connector 15 are completely engaged with each other.

In this manner, because the rotating lever 42 is rotated from the initial engaging position to the complete engaging position without meeting substantial resistance, the shielded connector 2 and the mating shielded connector 15 can be connected with each other with a low insertion force. Namely, torque of the rotating lever 42 is increased by the wall composing the curved portion 47c of the engaging groove 47 to be large force in the engagement direction of the connectors 2, 15, so that labor for the engagement of the connectors 2, 3 is reduced. In short, the rotating lever 42 is formed as a rotation lever for engaging with a low insertion force.

Further, because the flat spring 50 as the resilient abutting member 48 is provided at the side portion 45 of the rotating lever 42, the conductive connector housing 3 and the mating connector housing 17 are reliably connected with each other. Namely, when the connectors 2, 15 are to be completely engaged with each other by rotating the rotating lever 42, if the flat spring 50 is provided at the side portions 45 of the rotating lever 42, the flat spring 50 abuts on the first side surface 15a (mating connector housing 17) of the mating shielded connector 15 to be resiliently deformed by the pressure of the abutting in a path of rotation of the rotating lever 42. While keeping this state, the rotating lever 42 rotates to engage completely the connectors 2, 15 with each other. Thus, when the connectors 2,15 are completely engaged with each other, because the flat spring 50 resiliently abuts on the mating connector housing 17 by urging force (force of restitution), the rotating lever 42 and the mating connector housing 17 are electrically connected with each other reliably. Therefore, because shield connection between the conductive connector housing 3 and the mating connector housing 17 is established reliably, when the mating connector housing 17 is a motor housing, the motor can be grounded simultaneously through a plurality of shielded electric wire even for a long time. Thus, a safety of the motor becomes high.

Further, after completely engaging the connectors 2, 15 with each other, as shown in FIG. 4, connectors for signal detection 51 are engaged with two connector-attaching members 24 respectively. Thus, a member for preventing a release of the lever 52, which is provided on the connector for signal detection 51, is positioned around the lever portion 44 of the rotating lever 42 along the lever portion 44 to prevent a rotation of the rotating lever 42 (lever portion 44), so that the engagement (connection) of the connectors 2, 15 is prevented from being separated.

Therefore, in the structure of connecting shielded connectors of this invention, when the connectors 2, 15 are engaged with each other by rotating the conductive rotating lever 42, the resilient abutting member 48 (flat spring 50) abuts on the mating connector housing 17 to be resiliently deformed. Then, through this resiliently deformed flat spring 50, the rotating lever 42 abuts on the mating connector housing 17. Thus, the shielded connection between the conductive connector housing 3 and the mating connector housing 17 is reliably established. In this manner, because the rotating lever 42 abuts on the mating connector housing 17 by the flat spring 50 being resiliently deformed while the connectors 2, 15 are engaged each other, the rotating lever 42 does not wobble. Therefore, because a wobbling state of the rotating lever 42 differs according to whether the shielded connectors are connected with each other or not, a state of connection between the conductive connector housings 3, 17 can be ascertained by the wobbling state of the rotating lever 42.

Additionally, because the flat spring 50 is disposed at the position where the flat spring 50 abuts on the mating connector housing 17 in a path of the rotation of the rotating lever 42, the rotating lever 42 can be rotated with smaller force than the case that the flat spring 50 is being deformed from the start of said rotation. It is because the rotation of the rotating lever 42 in this manner of this invention does not need an additional force for deforming the flat spring 50 at the start, while said rotation needs a large force for rotating the rotating lever 42 at the start. Therefore, the pair of shielded connectors 2, 15 can be engaged with each other easier. Incidentally, the rotation of the rotating lever 42 can be done without so much force even adding the force for deforming resiliently the flat spring 50 in a path of the rotation of the rotating lever 42.

Moreover, since the resilient abutting member 48 is a flat spring 50 formed by bending a part of the rotating lever 42 (side portion 45), this structure of connecting does not need additional conductive member as the resilient abutting member 48 and an operation for attaching the resilient abutting member 48, and guarantees an electrical connection between the resilient abutting member and the rotatable conductive lever or the other connector housing. Therefore, a reliable shielded connection between the conductive connector housing 3 and the mating connector housing 17 can be achieved with a simple structure.

Although this invention has been fully described by way of examples with reference to the accompanying drawings, it is to be noted that various changes and modifications can be made in a scope of this invention.

What is claimed is:

1. A structure of connecting shielded connectors comprising:
   a pair of connectors;
   conductive connector housings of the respective connectors;
   a rotatable conductive lever mounted on either one of the conductive connector housings;
   an engaging part of the other conductive connector housing for engaging with the rotatable conductive lever to connect the pair of connectors with each other; and
   a resilient conductive abutting member mounted on at least one of the rotatable conductive lever and the other conductive connector housing for abutting the at least one of the other conductive connector housing and the rotatable conductive lever as being resiliently deformed, wherein said pair of connectors establishes shield connection when being connected with each other, wherein the resilient abutting member is a flat spring formed by bending a part of the at least one of the rotatable conductive lever and the other conductive connector housing.

2. The structure of connecting shielded connectors as claimed in claim 1, wherein the resilient abutting member is disposed in a path of rotation of the rotatable conductive lever to connect the shielded connectors with each other, where the resilient abutting member starts to abut the at least one of the other connector housing and the rotatable conductive lever.

3. The structure of connecting shielded connectors as claimed in claim 1, wherein the rotatable conductive lever has a longer rotary length than a moving length, for allowing the shielded connector to be inserted into the other shielded connector with low insertion force.

4. The structure of connecting shielded connectors as claimed in claim 3, wherein the resilient abutting member is disposed in a path of rotation of the rotatable conductive lever to connect the shielded connectors with each other, where the resilient abutting member starts to abut the at least one of the other connector housing and the rotatable conductive lever.

* * * * *